March 29, 1960     O. S. WELSH     2,930,405
TUBE WITH INTERNAL FINS AND METHOD OF MAKING SAME
Filed May 31, 1955
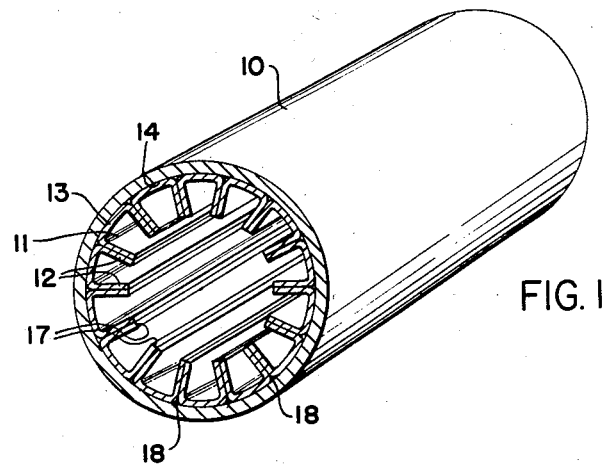
FIG. 1
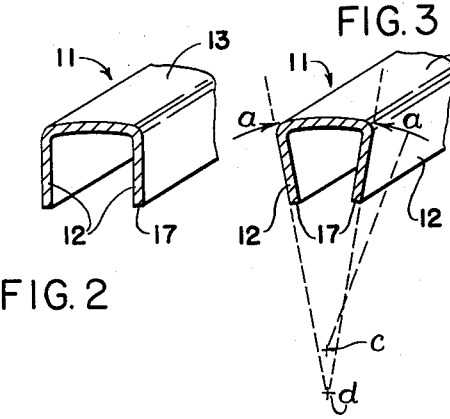
FIG. 2    FIG. 3
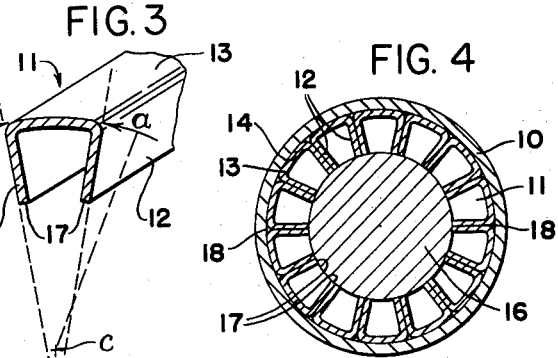
FIG. 4
FIG. 6
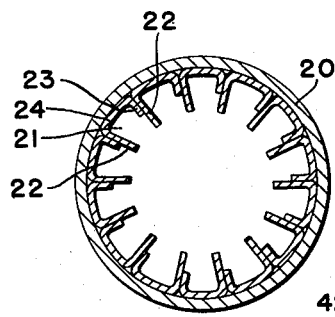
FIG. 5
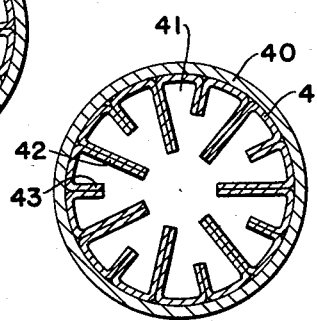
FIG. 7
INVENTOR.
ORAL S. WELSH
BY *Bosworth, Sessions*
*Herretson, Lawler*
ATTORNEYS United States Patent Office 2,930,405
Patented Mar. 29, 1960

2,930,405

TUBE WITH INTERNAL FINS AND METHOD OF MAKING SAME

Oral S. Welsh, Elyria, Ohio, assignor to Brown Fintube Company, Elyria, Ohio, a corporation of Ohio Application May 31, 1955, Serial No. 511,840

7 Claims. (Cl. 138—38)

This invention relates to heat exchanger tubes with internal fins and to methods of making such tubes. More particularly, the invention relates to heat exchanger tubes with separately formed longitudinally extending fins that are preferably bonded to the inner surfaces of the tubes by means of a bonding metal that is fused in the bonding operation. This type of bonding is hereinafter referred to as brazing, and the term brazing as used herein is intended to cover bonding methods ordinarily known as soldering, silver soldering, brazing, copper brazing, hydrogen brazing, and the like.

The general objects of the invention are the provision of improved heat exchanger tubes having separately formed longitudinally extending internal fins and of an improved and economical method of making such tubes. More specific objects include the provision of a heat exchanger tube in which the longitudinally extending internal fins are constituted by an assembly of fin members so constituted as to hold themselves firmly and resiliently against the interior surface of the tube, the provision of such a tube in which the base portions of the fin members are brazed to the inner surface of the tube, and, if desired, the fin portions of adjacent fin members are brazed to each other, and the provision of a method for making such a tube.

Heat exchanger tubes with separately formed internal fins are desirable for many purposes, but the manufacture of such tubes has been difficult and expensive, particularly in the smaller sizes. In order to secure efficient heat exchange, it is preferable that the internal fin members be properly bonded to the inner surface of the tubes throughout the length of the fin members so as to provide continuous metallic paths for the flow of heat. The bonding is preferably accomplished by brazing and in order to provide a good brazed connection, it is necessary that the surfaces to be joined together be firmly in contact with each other at the time that the brazing heat is applied and the bonding metal fused. It has been difficult to hold separately formed fin members in contact with the inside surfaces of a tube during a brazing operation, and the difficulty is increased by variations in the dimensions of the fin members and in the diameter and roundness of the tubing. Also, in internally finned tubes made by prior methods, it has been difficult to space the fins uniformly and accurately and the non-uniform spacing has resulted in impairment of the efficiency of the tubes.

According to the present invention, efficient finned tubes that can be produced at reasonable cost are provided by a construction in which open channel section fin members are fitted together within the tube in such a manner that they hold themselves in place with their base portions urged firmly against the inner surface of the tube without requiring internal support. Preferably the fin members are brazed to the inner surface of the tube and to each other. According to a preferred form of the method, the tube is produced by providing a plurality of open channel section fin members, each fin member having a pair of flanges and a base portion which is curved transversely to conform to the internal surface of the tube. These fin members are so dimensioned that the total width of members at or adjacent the base portions thereof is substantially equal to the inner circumference of the tube within which they are to be installed; so that when the members are assembled in the form of a ring, the assembly fits snugly within the tube. The flanges of adjacent members also are preferably arranged so that they resiliently engage each other when the members are assembled together in the form of a ring, and hence the channels must be deflected in order to insert the assembly in the tube. Thus the resilience of the flanges constantly urges the individual members outwardly into contact with the inner surface of the tube and maintains firm contact between the flanges of adjacent channel section members.

Referring to the drawings, Figure 1 is an isometric view showing a preferred form of internally finned tube made according to my invention.

Figure 2 illustrates one of the fin members in an intermediate stage of manufacture.

Figure 3 illustrates a completed fin member.

Figure 4 is an end view showing the assembly of a group of fin members, an internal mandrel, and a tube, and Figures 5, 6, and 7 are end views of modified forms of tubes embodying the invention.

Referring to Figure 1 of the drawings, a heat exchanger tube embodying my invention may comprise a tube 10 to which a plurality of open channel section fin members 11 are secured. Each fin member comprises a pair of fin portions 12 and a base portion 13, the base portions preferably being brazed to the inner surface 14 of the tube 10. The fin members extend generally longitudinally of the tube and thus provide extended heat exchange surface without seriously increasing the resistance to flow of fluids through the tube. The brazed connections between the bases 13 of the several fin members 11 and the inner surface 14 of the tube provide metallic paths of substantial area between the fin members and the tube, and thus insure efficient transfer of heat between the fin members and the tube. The outer surfaces of the fin portions 12 of adjacent fin members are preferably brazed together so that the contacting fin portions act, in effect, as a single fin.

As shown in Figures 1, 2 and 3, the base portions 13 of the fin members 11 preferably are arcuate, so that the outer surfaces of the base portions substantially conform to the inner surface of the tube. The base portions are of such width that when a group of fin members are assembled together in a ring, the assembly fits snugly within the inner surface of the tube with adjacent fin members firmly engaging each other. This is accomplished by making the total width of the base portions of the fin members in the assembly substantially equal to the inner circumference of the tube, or, if the fin members are all of the same width, by making base portions of such width that the arc indicated at a—a in Figure 3 of the drawing is substantially equal to the inner circumference of the tube divided by the number of fin members to be included in the tube. It will be evident from an inspection of Figure 1 that the adjacent fin members 11 engage each other in such a manner that the assembly of fin members is self-supporting within the tube. The fin portions extend substantially radially inwardly from the bases 13, and each fin member acts, in effect, as an element of an arch. The spacing of the fin members is determined by the members themselves; there is no possibility of displacement of the members once they have been assembled; hence the fin members are accurately positioned and the fin portions are accurately spaced.

In order to insure that the supporting action will take place properly and that the fin members will hold themselves firmly in engagement with the inner surface of the tube before and during the brazing operation, even though there may be slight dimensional variations in the fin members and the tube, the fin members are preferably produced as shown in Figures 2 and 3 by rolling them from flat stock. The initial rolling operation produces the form shown in Figure 2. The rolls give the base portion 13 the desired arcuate shape and width with a rather high degree of accuracy; the fin portions 12 cannot readily be deflected toward each other in the first operation; instead, they extend substantially parallel to each other as shown. After the first step, the fin members preferably are subjected to an additional operation preferably by means of rolls, wherein the fin portions 12 are bent toward each other as shown in Figure 3. As indicated in Figure 3, the radius of curvature of the base 13 is substantially equal to the radius of the tube within which the fins are to be assembled, the center of curvature of the base portion being indicated at c. In the assembly the fin portions extend substantially radially inwardly. The second rolling operation, however, does not deflect the fin portions 12 toward each other to radial positions conforming to the radius of curvature of the outer surface of the base portion 13, but rather they are deflected a slightly lesser amount, so that the planes in which the fin portions lie intersect at a distance from the base portion 13 greater than the radius of the tube. For example, in the drawing, the planes of the fin portions intersect at point d whereas in the completed tube the planes of the fin portions will intersect approximately at c. In practice, the distance between the points c and d can be quite small; i.e., the fins can be deflected almost to the radial positions.

With this arrangement, it is evident that when a group of fin members is assembled into a ring with the fin portions 12 of adjacent members in contact with each other, the radius of the assembly will be slightly greater than the radius of curvature of the base portions and greater than the radius of the tube for which the assembly is intended. In order to insert an assembly of such fin members within the tube, the fin portions of each fin member must be deflected toward each other so that they ultimately take the substantially radial position shown in Figures 1 and 4. Because of the necessity for deflection of the fin portions toward each other, firm, resilient contact between the fin portions is assured. The fin members in the assembly constantly are urged outwardly firmly into contact with the inner surface of the tube 10 by contact with each other.

In order to insert the channel members within the tube, the required number of fin members is preferably assembled around a mandrel 16 having an outer diameter conforming to the inner diameter of the circle defined by the inner edges 17 of the fin portions. The fin members are compressed adjacent one end of the assembly by means of an appropriate clamp or a suitable funnel-shaped guide, so that they can be entered into the tube together with the mandrel. The mandrel and the fin members are pushed into the tube, giving an assembly such as shown in Figure 4, and then the fin members are held against movement out of the tube while the mandrel is withdrawn from the tube leaving the fin members supporting each other within the tube.

Since the fin members are self-supporting within the tube, the brazing operation presents no particular problem. When ferrous tubes and fin members are employed, copper brazing gives excellent results. To carry out the copper brazing, the surfaces of the tube and fins are cleaned prior to assembly, and copper is supplied to the contacting surfaces of the parts. This can be done, for example, by copper plating the fin members or the tube, or both, by supplying metallic copper in the form of paste or powder to the surfaces to be joined, or by inserting copper wires in the spaces 18 that are left between the base portions of adjacent fin members. The copper brazing operation is completed by raising the temperature of the assembly to the required degree with the parts protected from corrosion in the usual reducing atmosphere.

For non-ferrous tubes, silver soldering or brazing operations are preferred. Such operations can be carried out by tinning the outer surfaces of the base portions and fin portions of the fin members with solder, supplying flux to the surfaces and inserting the tinned surfaces with the flux thereon into the tube. The assembly is then brought to brazing temperature and permitted to cool. The heating can be accomplished, for example, by inserting the entire assembly in an appropriate furnace, by heating the tube progressively by means of a torch or an electric heating element on the inside of the tube, by means of a ring burner on the exterior of the tube, or by induction heating or the like.

Regardless of the particular method employed, the brazing operation presents no serious problem, because the fin members hold themselves firmly in place and are constantly resiliently urged outwardly against the inner surface of the tube; the fin members conform substantially to the tube, and good bonds between the fin members and the tube and between the contacting outer surfaces of the fin portions of adjacent fin members are obtained regardless of reasonable dimensional variations in the fin members and the tube.

It will be evident that various types of fin members and combinations of fin members can be employed. Figure 1 shows identical fin members with the fin portions of equal width; i.e., of equal radial dimensions. For some purposes lighter fins may be sufficient and in such cases, the arrangement shown in Figure 5 may be utilized. Here the tube 20 is provided with a plurality of open channel section fin members 21, each having a wide fin portion 22, a narrow fin portion 23, and a base portion 24. The fin members are arranged with the narrow fin portion of each fin member in engagement with the wide fin portion of an adjacent fin member. The members are proportioned with respect to the inner diameter of the tube as before, and the engagement between the fin portions 22 and 23 of adjacent fin members holds the fin members securely in position as before. The fin members may be brazed to the tube and to each other by the methods described above.

A somewhat similar form is illustrated in Figure 6. Here the tube 30 is provided with alternately disposed open channel section fin members 31 and 32. Fin members 31 have base portions 33 and relatively wide fin portions 34, while fin members 32 have base portions 35 and relatively short fin portions 36. The fin members 31 may be considered as of greater importance from a heat exchange standpoint, providing more extended surface area than the fin members 32. The fin members 32 complete the assembly that enables the fin members to be self-supporting, and the shorter fin portions 35 provide increased metal for the transmission of heat adjacent the bases of the fins 33 where the heat flow is the greatest. These fin members are proportioned to be self supporting as before and also may be brazed to the tube and to each other as described above.

In the modification shown in Figure 7 the tube 40 is provided with open channel section fin members 41, which are generally similar in shape to the fin members 21 of Figure 5, each having a relatively wide fin portion 42, a relatively narrow fin portion 43, and a base portion 44. In this form of the invention, however, the wide fin portions 42 of adjacent fin members engage each other, and the narrow fin portions 43 of adjacent fin members engage each other, thus providing in the assembly alternate wide and narrow fins. Constructions of this type are useful where it is desired to extend the fins well toward the center of the tube and yet not have the fins approach each other too closely. In Figure 7, for example, if all of the fin portions were of the same width as the wide fin portions 42, then the fins would extend very close to each other in the central part of the tube. There would be serious likelihood of fouling of the fins with some kinds of fluids, and the resistance to flow of fluid through the tube would be greatly increased. With a tube such as shown in Figure 7, however, the alternate wide and narrow fins give excellent heat exchange capacity without undue increase in resistance to flow, and the spacing of the fins is great enough to minimize the likelihood of fouling. It will be evident that variations of the general arrangement shown in Figure 7 can be employed. For example, in some instances, it may be desirable to make only every third or fourth fin a wide one. It is also evident that the widths of the fin portions can be varied in other manners where that appears to be desirable from a heat exchange standpoint.

It is evident that other arrangements could be employed without departing from the spirit and scope of the invention. Thus, the base portions of the alternate fin members need not be equal, and the number of fin members within a tube can be varied, so long as the total width of the bases of the fin members gives the required circumference so that the fin members hold themselves firmly in position. The width of the fin portions can be varied to suit different requirements and the inner edges of the fin portions need not define a circle. A circular mandrel need not be employed; the mandrel can be of the required shape to most conveniently support the fin members. While it is preferred to braze the fin members to the tube and to each other, for some purposes brazing of the fin members to the tube only may be sufficient; and where heat exchange efficiency is of lesser importance, the brazing step may be omitted entirely, since the assembly of fin members is able to support itself firmly within the tube.

The method of the present invention is advantageous because it can be carried out economically and does not require any complicated tools, jigs, or fixtures. The fin members resiliently support themselves in position for brazing, so that great accuracy in the production of the fin members is not required for good results in brazing, nor is it necessary to utilize any particular care in the brazing operation. The fin members cannot be accidentally displaced in the brazing operation, so that accurate spacing of the fin portions is assured.

The preferred tubes are highly efficient from a heat exchange standpoint because of the relatively large area of metallic bond between the fin members and the tube to provide paths for the transfer of the heat between the fins and the tube itself, and because of the accuracy with which the fin members are held in position. The method adapts itself to the production of a wide variety of tubes; heavy-duty tubes can be provided as shown in Figure 1 where the fin members are of substantial thickness and the flanges of adjacent fin members are co-extensive, providing, in effect, fins of double thickness. The thickness of the fins, of course, can be varied as can their width. The arrangements shown in Figures 5 and 6 give, in effect, fins of tapering thickness which are efficient in the use of metal from a heat exchange standpoint.

Those skilled in the art will appreciate that further changes and modifications can be made in the invention without departing from the spirit and scope thereof. The essential characteristics of the invention are defined in the appended claims.

I claim:

1. A heat exchange tube comprising a tube having a plurality of separately formed longitudinally extending open channel section fin members, each fin member having a base portion substantially conforming to the interior surface of the tube and brazed thereto and a pair of separate fin portions extending inwardly from the edges of the base portion, the total width of the base portions being substantially equal to the inner circumference of the tube, the fin members being positioned within the tube with the outer surfaces of the fin portions of each channel in contact with and brazed to the outer surface of a fin portion of an adjacent channel, the finned portions of alternate fin members being respectively relatively wide and relatively narrow.

2. The method of making heat exchanger tubes which includes the steps of providing a tube, providing a plurality of open channel section fin members each having a base and a pair of fin portions extending from the edges of the base, the total width of said bases being substantially equal to the internal circumference of the tube, assembling the fin members within the tube with the base portions in contact with the inner surface of the tube and the fin portions of each member resiliently engaging a fin portion of an adjacent member, whereby said members are held in place by forces exerted by said members against each other, and thereafter brazing said base portions to the interior surface of the tube and said engaging fin portions to each other.

3. The method of making heat exchanger tubes which includes the steps of providing a tube, providing a plurality of fin members each having a base and a pair of fin portions extending from the edges of the base, the total width of said bases being substantially equal to the internal circumference of the tube, assembling the fin members within the tube with the base portions in contact with the inner surface of the tube and the fin portions of each member resiliently engaging a fin portion of an adjacent member, whereby said members are held in place by forces exerted by said members against each other, and thereafter brazing said base portions to the interior surface of the tube.

4. The method of making heat exchanger tubes which includes the steps of providing a tube, providing a plurality of fin members each having a base and a pair of fin portions extending from the edges of the base, the total width of said bases being substantially equal to the internal circumference of the tube, and assembling the fin members within the tube with the base portions in contact with the inner surface of the tube and held thereagainst by forces exerted by said members against each other.

5. The method of making heat exchanger tubes which includes the steps of providing a tube, providing a plurality of fin members each having a base and a pair of fin portions extending from the edges of the base, assembling the fin members together in annular form with their base portions forming the outer surface of the annulus and with the outer surfaces of the fin portions of each fin member in contact with the outer surface of a fin portion of an adjacent fin member, the outer circumference of the assembly being at least substantially as great as the inner circumference of the tube, supporting the assembly on a mandrel, inserting the assembly while so supported into the tube, withdrawing the mandrel from the tube and leaving the assembly of fin members therein, with the fin members in the assembly having their base portions supported in firm engagement with the inner surface of the tube.

6. The method of making heat exchanger tubes which includes the steps of providing a tube, providing a plurality of open channel section fin members each having a base and a pair of fin portions extending from the edges of the base, assembling the fin members together in annular form with their base portions forming the outer surface of the annulus and with the outer surfaces of the fin portions of each fin member in contact with the outer surface of a fin portion of an adjacent fin member, the outer circumference of the assembly being at least substantially as great as the inner circumference of the tube, supporting the assembly on a mandrel, inserting the assembly while so supported into the tube, withdrawing the mandrel from the tube and leaving the assembly of fin members therein with the fin members in the assembly having their base portions supported in firm engagement with the inner surface of the tube, and thereafter brazing the fin members to the tube and to each other.

7. The method of making heat exchanger tubes which includes the steps of providing a tube, providing a plurality of open channel section fin members each having a base and a pair of fin portions extending from the edges of the base, assembling the fin members together in annular form with their base portions forming the outer surface of the annulus and with the outer surfaces of the fin portions of each fin member in contact with the outer surface of a fin portion of an adjacent fin member, the combined width of the bases of said members being substantially equal to the inner circumference of the tube, the fin portions resiliently engaging each other to give the assembly a circumference greater than the inner circumference of the tube, supporting the assembly on a mandrel and reducing the circumference of at least an end portion of the assembly to enable the assembly to be introduced into the tube, inserting the assembly while so supported into the tube, withdrawing the mandrel from the tube and leaving the assembly of fin members therein, with the fin members in the assembly having their base portions supported in firm engagement with the inner surface of the tube by engagement of the fin portions with each other, and thereafter brazing the fin members to the tube and to each other.

References Cited in the file of this patent

UNITED STATES PATENTS

| | | |
|---|---|---|
| 349,060 | Serve | Sept. 14, 1886 |
| 813,918 | Schmitz | Feb. 27, 1906 |
| 879,302 | Nesmith | Feb. 18, 1908 |
| 1,519,673 | Doble | Dec. 16, 1924 |
| 1,906,984 | Lyman | May 2, 1933 |
| 1,918,655 | McGrew | July 18, 1933 |
| 2,342,117 | Brown et al. | Feb. 22, 1944 |
| 2,427,299 | Muerle | Sept. 9, 1947 |
| 2,473,633 | Brown | June 21, 1949 |
| 2,488,615 | Arnold | Nov. 22, 1949 |
| 2,616,163 | Schmitz et al. | Nov. 4, 1952 |
| 2,726,681 | Gaddis et al. | Dec. 13, 1955 |

FOREIGN PATENTS

| | | |
|---|---|---|
| 7,213 | Great Britain | Apr. 14, 1892 |
| 330,182 | Italy | Oct. 7, 1935 |